Figure 1:
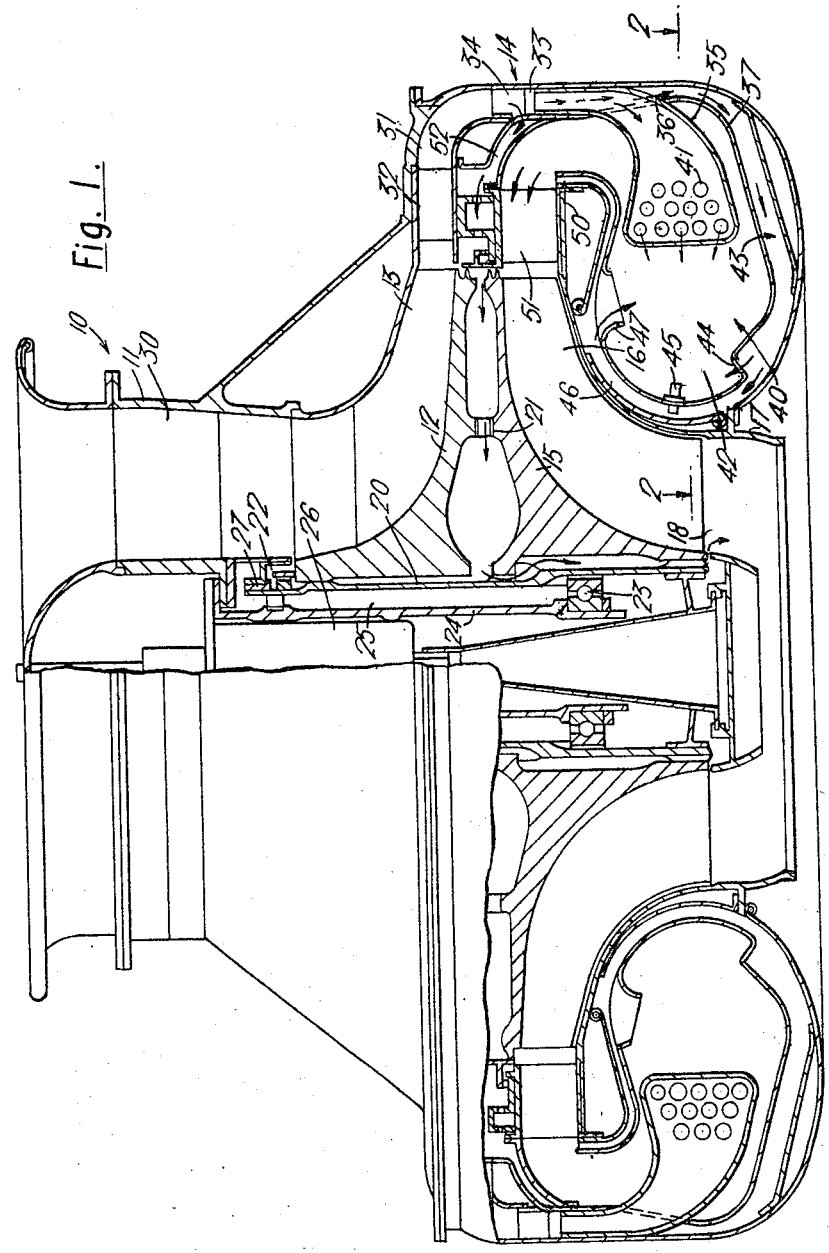

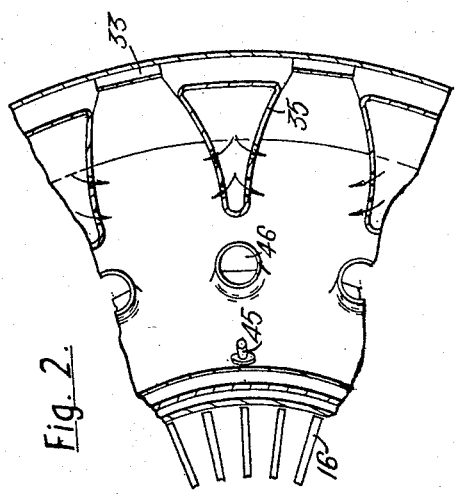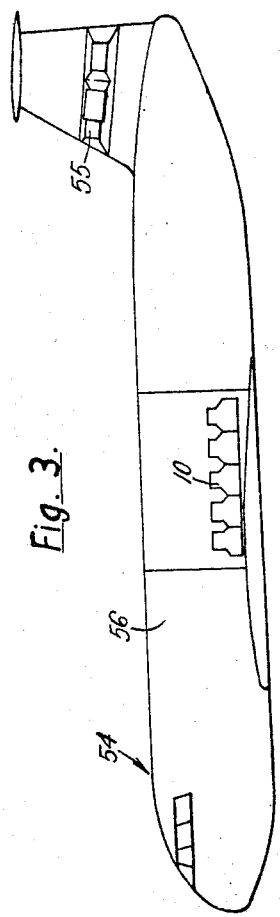

United States Patent Office 3,285,006
Patented Nov. 15, 1966

3,285,006
GAS TURBINE VERTICAL LIFT ENGINE
Frederick Freeman, Derby, and Herbert Frank Smith, Allenton, Derby, England, assignors to Rolls-Royce Limited, Derby, England, a company of Great Britain
Filed Jan. 9, 1964, Ser. No. 336,792
Claims priority, application Great Britain, Jan. 31, 1963, 4,126/63
11 Claims. (Cl. 60—39.36)

This invention concerns a gas turbine vertical lift engine, that is to say a gas turbine engine which is adapted to produce vertical lift forces on an aircraft independently of those generated aerodynamically by forward flight of the aircraft.

According to the present invention, there is provided a gas turbine vertical life engine comprising a centrifugal compressor, an inward radial flow turbine which is arranged to drive the compressor and which is disposed back to back therewith and annular combustion equipment having an annular inlet passage which is adapted to receive air flowing in a radially outward direction from the compressor, the combustion equipment having an annular outlet passage which is adapted to deliver combustion gases in a radially inward direction to the turbine.

The maximum axial length of the engine is preferably less than its maximum diameter. It will be appreciated that such an arrangement is very desirable in a lift engine where there may be limited axial room for the engine in the fuselage or wing of the aircraft in which it is mounted.

The combustion equipment preferably comprises an annular combustion chamber, and a plurality of angularly spaced dilution air chutes which extend into the inlet passage and which communicate with the combustion chamber downstream of a combustion zone therein, the arrangement being such that one portion of the air supplied to the inlet passage passes via the chutes and into the combustion chamber so as to dilute the combustion gases therein, while another portion of the air supplied to the inlet passage passes between said chutes and is supplied to the combustion zone so as to support combustion thereat.

Preferably means are provided for dividing the said other portion of air into two parts one of which forms a primary air supply to the combustion chamber and the other of which forms a secondary air supply therefor.

Means are preferably provided for directing a further portion of the air supplied to the inlet passage past the wall of the outlet passage so as to cool the latter. The said further portion is, moreover, preferably directed between the compressor and turbine and then into the turbine exhaust gases.

The compressor and the turbine may be mounted on common shafting within which there is mounted fuel supply control equipment for controlling the supply of fuel to the engine.

The invention also comprises an aircraft provided with a vertically mounted gas turbine vertical lift engine as set forth above.

The invention is illustrated, merely by way of example, in the accompanying drawings, in which:

FIGURE 1 is an elevation, partly in section, of a gas turbine vertical lift engine according to the present invention, FIGURE 2 is a broken away section taken on the line 2—2 of FIGURE 1, and FIGURE 3 is a diagrammatic side view of an aircraft provided with gas turbine vertical lift engines as shown in FIGURES 1 and 2.

Referring to the drawings, a gas turbine vertical lift engine 10 for an aircraft comprises in flow series an air intake 11, a centrifugal compressor 12 having rotor blades 13, annular combustion equipment 14, an inward radial flow turbine 15 having rotor blades 16, and a short curved exhaust duct 17 leading to a nozzle 18.

The compressor 12 and turbine 15, which are mounted back to back on a common shaft 20, are drivingly coupled together by a toothed coupling 21 such as that sold under the Registered Trademark "CUR-VIC."

The shaft 20 is rotatably mounted, by means of a front bearing 22 and a rear bearing 23, on a shaft 24, the shaft 20 being spaced from the shaft 24 by a space 25. Within the shaft 24 is mounted fuel supply control equipment 26 which controls the supply of fuel to the combustion equipment 14. An oil reservoir 27 is disposed immediately above the front bearing 22, and oil may flow from the reservoir 27 and then through the space 25 to the rear bearing 23.

Oil may be supplied to the reservoir 27 (e.g. in the form of a single shot of oil), and fuel may be supplied to the fuel supply control equipment 26, by means of pipes (not shown) which pass through a hollow strut 30 extending across the air intake 11.

The combustion equipment 14 comprises an annular inlet passage 31 which is adapted to receive air flowing in a radially outward direction from the compressor 12.

Mounted within and adjacent the inlet end of the inlet passage 31 are diffuser vanes 32. The inlet passage 31, on the downstream side of the diffuser vanes 32, is bent through a right angle so as to have an annular axially extending portion 33 in which are mounted flow straightening vanes 34.

The upstream ends of a plurality of angularly spaced apart dilution air chutes 35 extend into the portion 33 of the inlet passage 31, immediately downstream of the vanes 34. Each of the chutes 35 extends through an aperture 36 in the wall 37 of an annular combustion chamber 40 which is substantially elliptical in cross section. Each chute 35 extends a substantial distance into the combustion chamber 40 and the wall of each chute 35 is provided at its downstream end with a plurality of holes 41.

About 60% of the compressed air in the inlet passage 31 passes via the chutes 35 and holes 41 into the combustion chamber 40 downstream of the combustion zone 42 therein. This portion of the air is used to dilute the combustion gases so as to reduce their temperature to a value acceptable to the turbine 15. Most of the remaining 40% of the compressed air passes between the chutes 35 and through a radially inwardly directed portion 43 of the inlet passage 31.

A portion of the compressed air from the portion 43 passes through apertures in a plate 44 forming part of the wall 37, this portion constituting primary combustion air for supply to burners 45 in the combustion zone 42.

The remainder of the compressed air from the portion 43 passes through a portion 46 of the inlet passage 31 and enters the combustion chamber 40, as secondary air, through apertures 47 in the wall 37. This secondary air completes the combustion in the combustion zone 42 and stabilizes the primary combustion gas flow recirculation.

The combustion equipment 14 has an annular outlet passage 50 which receives the diluted combustion gases from the combustion chamber 40 and discharges them radially inwardly to the turbine 15. The outlet passage 50 is disposed between the combustion chamber 40 and the inlet end of the inlet passage 31. Turbine nozzle guide vanes 51 are mounted in the outlet passage 50.

As will be seen from FIGURE 1, the inlet passage 31 extends around and so cools the greater part of the wall 37 of the combustion chamber 40.

A small proportion of the compressed air in the inlet passage 31 is directed through a passage 52 and past the wall of the outlet passage 50 so as to cool the latter. This air then passes between the compressor 12 and turbine 15, through the coupling 21, and thence inwardly of the turbine 15 so as to pass into the turbine exhaust gases.

As will be seen from FIGURE 1, the maximum axial length of the combustion equipment 14 is less than half (e.g. is about one third) of its maximum diameter. Similarly, the maximum axial length of the engine 10 is substantially less (e.g. is about one third less) than its maximum diameter. This axial compactness of the combustion equipment 14 and of the whole engine 10 is an important feature since it permits the engine 10 to be installed in the fuselage or wing of an aircraft where there may be limited room for the axial extent of an engine.

In FIGURE 3 there is shown diagrammatically an aircraft 54 having a plurality of forward propulsion gas turbine engines 55 and a bank of the gas turbine vertical lift engines 10 of FIGURES 1 and 2, the engines 10 being vertically mounted in the fuselage 56 of the aircraft 54.

We claim:

1. A gas turbine vertical lift engine comprising a centrifugal compressor, an inward radial flow turbine which drives the compressor and which is disposed back to back therewith, an annular inlet passage which receives air flowing in a radially outward direction from the compressor, an annular combustion chamber having a combustion zone therein, a plurality of perforated angularly spaced dilution air chutes which extend into the inlet passage and extend radially inwardly into the combustion chamber downstream of the combustion zone therein, means ensuring that one portion of the air supplied to the inlet passage passes via the chutes and into the combustion chamber so as to dilute the combustion gases therein, while another portion of the said air passes between said chutes and is supplied to the combustion zone so as to support combustion thereat, and an annular outlet passage which delivers combustion gases in a radially inward direction from the combustion chamber to the turbine.

2. A gas turbine vertical lift engine comprising a centrifugal compressor, an inward radial flow turbine which drives the compressor and which is disposed back to back therewith, an annular inlet passage which receives air flowing in a radially outward direction from the compressor, an annular combustion chamber, having a combustion zone therein, a plurality of perforated angularly spaced dilution air chutes which extend into the inlet passage and which extend radially inwardly a substantial distance into the combustion chamber downstream of the combustion zone therein, means ensuring that one portion of the air supplied to the inlet passage passes via the chutes and into the combustion chamber so as to dilute the combustion gases therein, while another portion of the said air passes between said chutes and is supplied to the combustion zone so as to support combustion thereat, and an annular outlet passage which delivers combustion gases in a radially inward direction from the combustion chamber to the turbine.

3. A gas turbine vertical lift engine as claimed in claim 2 in which the perforations are provided in the wall of each chute through which dilution air may enter the combustion chamber.

4. A gas turbine vertical lift engine as claimed in claim 3 in which means are provided for dividing the said other portion of air into two parts one of which forms a primary air supply to the combustion chamber and the other of which forms a secondary air supply therefor.

5. A gas turbine vertical lift engine as claimed in claim 1 in which the combustion chamber is substantially elliptical in cross section, the inlet passage extending around the greater part of the wall of the combustion chamber, and the outlet passage being disposed between the combustion chamber and the inlet end of the inlet passage.

6. A gas turbine vertical lift engine as claimed in claim 5 in which the inlet passage is provided with flow straightening vanes.

7. A gas turbine vertical lift engine comprising a centrifugal compressor, an inward radial flow turbine which drives the compressor and which is disposed back to back therewith, an annular inlet passage which receives air flowing in a radially outward direction from the compressor, an annular combustion chamber having a combustion zone therein, a plurality of perforated angularly spaced dilution air chutes which extend into the inlet passage and which extend radially inwardly a substantial distance into the combustion chamber downstream of the combustion zone therein, means ensuring that one portion of the air supplied to the inlet passage passes via the chutes and into the combustion chamber so as to dilute the combustion gases therein, while another portion of the said air passes between said chutes and is supplied to the combustion zone so as to support combustion thereat, an annular outlet passage which delivers combustion gases in a radially inward direction from the combustion chamber to the turbine and means ensuring that a further portion of the said air flows past and in contact with the outlet passage so as to cool the latter.

8. A gas turbine vertical lift engine as claimed in claim 7 in which means are provided for directing the said further portion between the compressor and turbine and then into the turbine exhaust gases.

9. A gas turbine vertical lift engine as claimed in claim 8 in which the compressor and the turbine are mounted on common shafting within which there is mounted fuel supply control equipment for controlling the supply of fuel to the engine.

10. A gas turbine vertical lift engine as claimed in claim 1 in which diffuser vanes are mounted within and adjacent the inlet end of the said inlet passage.

11. A gas turbine vertical lift engine as claimed in claim 1 in which turbine nozzle guide vanes are mounted in the said outlet passage.

References Cited by the Examiner

UNITED STATES PATENTS 2,709,893 6/1955 Birman.
3,021,675 2/1962 Schroeder _____ 60—39.74

FOREIGN PATENTS 902,510 8/1962 Great Britain.

MARK NEWMAN, *Primary Examiner.*

R. D. BLAKESLEE, *Assistant Examiner.*